US005093810A

United States Patent [19]

Gill

[11] Patent Number: 5,093,810

[45] Date of Patent: Mar. 3, 1992

[54] MATCHING MEMBER

[75] Inventor: Michael J. Gill, Milford on Sea, England

[73] Assignee: British Gas PLC, London, England

[21] Appl. No.: 414,442

[22] Filed: Sep. 29, 1989

[30] Foreign Application Priority Data

Sep. 29, 1988 [GB] United Kingdom ................. 8822903

[51] Int. Cl.[5] ................................................ H04B 1/02

[52] U.S. Cl. .......................................... 367/1; 367/152

[58] Field of Search ........................... 367/1, 138, 152; 128/663.01, 662.03; 73/644; 310/328

[56] References Cited

U.S. PATENT DOCUMENTS

| | | | |
|---|---|---|---|
| 2,198,885 | 4/1940 | Price | 181/290 |
| 2,707,755 | 5/1955 | Hardie et al. | 310/327 |
| 2,797,201 | 6/1957 | Veatch et al. | 114/69 |
| 3,515,910 | 6/1970 | Fritz et al. | 367/1 |
| 3,788,140 | 1/1974 | Turtle | 73/861.28 |
| 3,964,309 | 6/1976 | Husse et al. | 73/861.28 |
| 4,104,915 | 8/1978 | Husse | 73/118.2 |
| 4,325,262 | 4/1982 | Meisser | 73/861.28 |
| 4,523,122 | 6/1985 | Tone et al. | 73/644 |
| 4,536,673 | 8/1985 | Forster | 73/644 |
| 4,630,482 | 12/1986 | Traina | 73/861.28 |
| 4,787,252 | 11/1988 | Jacobson | 73/861.28 |

FOREIGN PATENT DOCUMENTS

| | | | |
|---|---|---|---|
| 5800486 | 11/1986 | Australia . | |
| 0025215 | 3/1981 | European Pat. Off. . | |
| 0116823 | 8/1984 | European Pat. Off. . | |
| 0119855 | 9/1984 | European Pat. Off. . | |
| 0124028 | 9/1981 | Japan | 374/119 |
| 1423061 | 1/1976 | United Kingdom . | |
| 1491530 | 11/1977 | United Kingdom . | |
| 1522620 | 8/1978 | United Kingdom . | |
| 1559030 | 1/1980 | United Kingdom . | |
| 2113668 | 8/1983 | United Kingdom . | |
| 8605350 | 9/1986 | World Int. Prop. O. . | |
| 06245 | 11/1987 | World Int. Prop. O. . | |

*Primary Examiner*—Daniel T. Pihulic
*Attorney, Agent, or Firm*—Oblon, Spivak, McClelland, Maier & Neustadt

[57] ABSTRACT

An acoustic matching member for a sonic transducer is disclosed which comprises a solid material, for example, a glass, in which a plurality of voids have been formed. A method is also included of forming an acoustic matching member for a transducer which includes the steps of forming the member from a material in which a plurality of voids have been introduced whereby the velocity of sound in the material with voids is substantially less than that of the material without voids in the direction of sound propagation of the member.

13 Claims, 2 Drawing Sheets

MATCHING MEMBER

BACKGROUND OF THE INVENTION

1. Field of the Invention

This invention relates to a transducer and more particularly to an acoustic matching member therefor.

2. Discussion of the Background

There are a number of useful measurement applications that are conveniently achieved by sending and receiving ultrasonic signals in gases in the frequency range between 100 KHz and 1 MHz or above. At these high frequencies, the conventional construction of sound transducers employed at lower frequencies (e.g. audio frequencies) is impractical as the overall dimensions become very small.

The normal method of making high frequency ultrasonic transducers is to use a selected piece of piezo ceramic (e.g. lead zirconate titanate or PZT) resonant at the required frequency. PZT is a hard, dense material of high acoustic impedance (approximately $3\times10^7$ in MKS units), while gases have very low acoustic impedance (of the order of 400 in the same units). PZT on its own gives very poor electro acoustic efficiency due to the large acoustic mismatch, even though this is improved somewhat by resonant operation.

Typically, the piezo ceramic element is a cylinder, whose circular end faces move in a piston-like manner in response to electrical stimulation of electrodes applied to these faces. The normal method for reducing the acoustic mismatch to gases is to apply an acoustic matching layer to the selected operational face of the PZT disc. This layer is a material of relatively low acoustic impedance whose thickness is one quarter of an acoustic wave length in the material at the chosen frequency of operation. This dimension results in a resonant action whereby (for sending) the small movements obtained at the face of the PZT cylinder are magnified considerably, and acceptable (though still now high) efficiency can be obtained. The criteria for acoustic-electric conversion (i.e. receiving) are the same as for electro-acoustic conversion (i.e. sending) and the same transducer may be used for both.

The efficiency attainable by this technique is limited entirely by the characteristics of available materials. An ideal material would have an acoustic impedance on the order of $10^5$ and very low internal losses, and also must be stable, repeatable and practical for use. There are no hitherto known materials that meet all these criteria. Some common approximations to the ideal requirements are:

1. Silicone elastomers. This class of materials is commonly used and provides a useful performance in many applications. Acoustic losses are low. Acoustic impedances down to about $7\times10^5$ can be attained. A significant drawback with these materials is a large variation of acoustic wavelength with temperature (typically 0.3%/K). This factor limits the range of operating temperatures over which correct reasonant matching is obtained.

2. Polymers generally. Many polymers give useful performance. Acoustic impedance is higher than for silicones—down to $1.5\times10^6$ so overall efficiencies are lower, but reasonably stable materials can be found.

3. Liquids and gases. Examples in the literature may be found of the experimental use of multiple acoustic matching layers. Liquids have generally very low losses and acoustic impedances down to about $10^6$. If a gas is compressed, its acoustic impedance rises directly with the compression ratio, and a captive volume of liquid or highly compressed, dense gas may be used as an acoustic matching layer. Such techniques are not practical for commercial application.

SUMMARY OF THE INVENTION

According to the invention in a first aspect there is provided an acoustic matching member for a transducer, the member comprising a material having a plurality of voids formed therein, the velocity of sound in the voided material in the direction of sound propagation of the member being substantially less than that for unvoided material.

According to the invention in a second aspect, there is provided a method of forming an acoustic matching member for a transducer which comprises the steps of forming the member from a material in which a plurality of voids have been introduced whereby the velocity of sound in the material with voids is substantially less than that of the material without voids in the direction of sound propagation of the member.

Such voids are preferably formed by compressing hollow microspheres under the application of heat to form an "aerated" material structure or by foaming molten material with a gas.

BRIEF DESCRIPTION OF THE DRAWINGS

An embodiment of the invention will now be described by way of example with reference to the accompanying drawings in which.

DESCRIPTION OF THE PREFERRED EMBODIMENT

Figure 1:
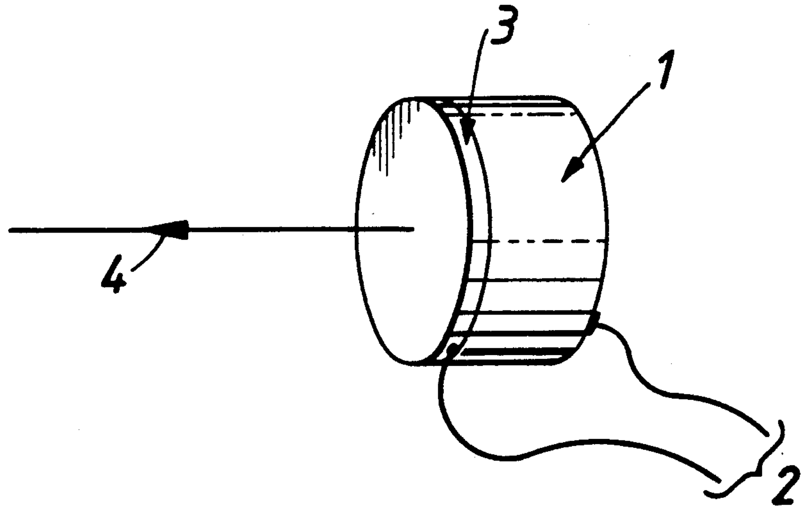
FIG. 1 is a side perspective view of a transducer.
Figure 2:
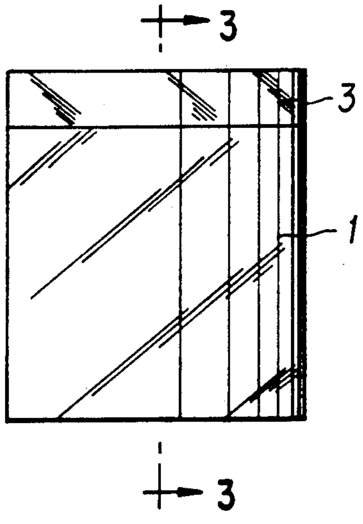
FIG. 2 is a side view.
Figure 3:
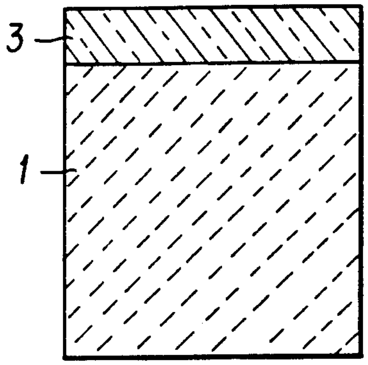
FIG. 3 is a view along lines III—III of FIG. 2.
Figure 4:
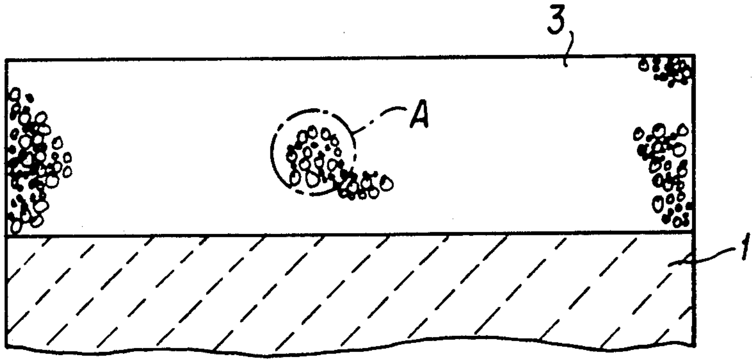
FIG. 4 is an amplified view of the matching member of the transducer shown in FIG. 3.

Referring to FIGS. 1 to 4 the transducer comprises a PZT cylinder 1 with electrical connecting wires 2 (FIG. 1) and a matching member layer 3, the direction of sound emission being indicated by arrow 4.

The matching member 3, which is in the form of a disc affixed to one end face of the cylinder 1, has one of the wires connected to its circumferential wall while the other wire is connected to the other end face of the cylinder.

Figure 5:
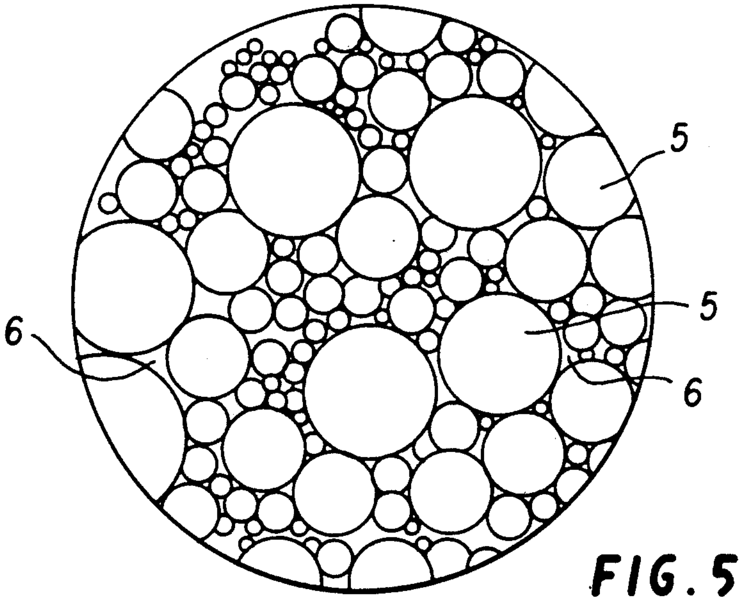
FIG. 5 is a further amplified view of the microstructure of portion A of the matching member of FIG. 4.

As shown in FIG. 5, the matching member 3 comprises a close packed matrix of glass bubbles or microspheres 5, the bubbles 5 being bonded together at adjoining surfaces while voids 6 are otherwise deliberately left between the bubbles 5, some of the voids 6 being interconnected.

Bulk acoustic impedance is the product of density and bulk acoustic velocity. Acoustic velocity in turn is a function of bulk elastic modulus. These parameters may be artificially adapted in an otherwise unsuitable material to create a material with substantially improved characteristics. A preferred starting material is C-glass (soda-lime-borosilicate glass) which is stable and has low loss, but has a very high acoustic impedance. The material can also be easily formed when heated and has a predictable degree of softening with temperature. By arranging for the glass to be formed into a sponge structure with a very high proportion of voids, acoustic impedances down to $3\times10^5$ have been experimentally obtained.

Glass is readily available in the form of glass bubbles (hollow microspheres), used in diverse commercial applications such as syntactic foams and car body fillers and manufactured, for example, by Minnesota Mining and Manufacturing Company Inc. under the trade name 3M GLASS BUBBLES.

A very light glass sponge structure is easily achieved by heating the glass bubbles in a mould to a temperature where the glass is soft, and compressing by a specific volumetric ratio to join the bubbles together.

Acceptable processing conditions are, for example, at a temperature of 650° C. approx. and a volumetric ratio of 1.5 to 2.5 to 1. With a suitable mould, the finished piece (2) is produced that may be applied to the PZT cylinder (1) without further adjustment.

For a given specification of glass bubbles and compression ratio, a repeatable result is obtained. For example glass bubbles with a starting density of 0.25 g/cm$^3$, compressed at a volumetric ratio of 2:1 produce a material having a propagation velocity (i.e. velocity of propagation of longitudinal bulk waves) of approximately 900 m/s, compared with 5-6000 m/s for unvoided glass. This gives an acoustic impedance of $4.5\times10^5$ compared with unvoided glass (p=2.5) which has an acoustic impedance of approximately $14\times10^6$.

The resultant voided material also exhibits practically no variation in acoustic wavelength or bulk elastic modulus with a temperature above the range of ambient temperatures.

As much of the material structure is formed by the voids between bubbles which communicate with the external surfaces (i.e. not "closed cell"), it is usually necessary to seal the material surface against ingress of moisture, etc. This can be achieved in various ways without seriously imparing the acoustic performance—for instance a thin layer of silicone elastomer or a thin layer of low melting point glass is satisfactory.

While, in the preferred embodiment described above, the material used is C-glass, this is not be construed as limitative and another glass or other non-crystalline material may be used.

Alternatively, a synthetics plastic material, for example a plastics resin or a metal, for example aluminium or titanium, may be employed. With resin, similar temperature dependent effects to those mentioned in the introduction will occur, although the invention does allow the velocity of sound propagation in the material to be adjusted. Furthermore, other methods of forming the acoustic matching member may be used, for example, by foaming the material to provide the necessary voids, these methods being particularly applicable for use with the plastics and metals mentioned above.

What is claimed as new and desired to be secured by letters patent of the United States is:

1. A transducer including an acoustic matching member which comprises a matrix of hollow spheres of a non-crystalline material in which adjoining spheres are bonded together at points of contact but otherwise voids are left between the spheres.

2. An acoustic matching member for a transducer, which comprises a matrix of hollow spheres of a non-crystalline material in which adjoining spheres are bonded together at their points of contact but otherwise voids are left between the spheres.

3. A member as claimed in claim 2 in which the material comprises glass.

4. A member as claimed in claim 3 in which the glass comprises C-glass.

5. A member as claimed in claim 2 in which the bulk elastic modulus of the material remains substantially constant with respect to a normal range of ambient temperatures.

6. A member as claimed in claim 2 in which the member comprises a moisture sealing layer enclosing the material.

7. A member as claimed in claim 6 in which the sealing layer comprises a silicone elastomer.

8. A member as claimed in claim 6 in which the sealing layer comprises a layer of glass.

9. A method of forming an acoustic matching member for a transducer, which comprises bonding together adjoining spheres in a matrix of hollow spheres of a non-crystalline material at points of contact of the spheres in such a way that otherwise there are voids left between the spheres.

10. A method as claimed in claim 9 in which the non-crystalline material comprises glass.

11. A method as claimed in claim 10 in which the glass comprises C-glass.

12. A method of forming an acoustic matching member for an acoustic transducer which comprises the steps of heating a plurality of hollow spheres of a material to a temperature at which the material softens and compressing the softened material in a mold.

13. A method as claimed in claim 12 in which the material is compressed at a start to finish volumetric ratio of 1.5-2.5 to 1.

* * * * *